United States Patent [19]

Roderbourg et al.

[11] Patent Number: 5,232,725
[45] Date of Patent: Aug. 3, 1993

[54] PROCESS FOR REDUCING THE CONTENT OF CHOLESTEROL AND OF FREE FATTY ACIDS IN AN ANIMAL FAT

[75] Inventors: Hubert Roderbourg, Niveze; Daniel Dalemans, Herstal; Robert Bouhon, Spa, all of Belgium

[73] Assignee: S.A.N. Corman, Brussels, Belgium

[21] Appl. No.: 821,898

[22] Filed: Jan. 15, 1992

Related U.S. Application Data

[63] Continuation of Ser. No. 492,447, Mar. 13, 1990, abandoned.

[30] Foreign Application Priority Data

Mar. 14, 1989 [BE] Belgium .............................. 08900278
Dec. 6, 1989 [BE] Belgium .............................. 08901307

[51] Int. Cl.$^5$ ................................................ A23D 7/00
[52] U.S. Cl. ..................................... 426/417; 426/422; 554/212
[58] Field of Search ........................ 426/417, 614, 422; 260/420

[56] References Cited

U.S. PATENT DOCUMENTS 3,491,132 1/1970 Reiners .................................. 260/420
4,880,573 11/1989 Courregelongue et al. ........ 260/420
5,063,077 11/1991 Vollbrecht et al. ................. 426/614

FOREIGN PATENT DOCUMENTS 0256911 2/1988 European Pat. Off. .
0326469 8/1989 European Pat. Off. .

OTHER PUBLICATIONS

Bayol et al., Process for elimination of steroids from substances of biological origin, French Patent Application, FR2626145A1 1989, Abstract only.

*Primary Examiner*—Joseph Golian
*Assistant Examiner*—Leslie Wong
*Attorney, Agent, or Firm*—Cushman, Darby & Cushman

[57] ABSTRACT

Process for reducing the content of cholesterol and of free fatty acids of an animal fat material, consisting of placing the fat in contact with cyclodextrin, under stirring and in the presence of water, the ratio by weight water/fat, the temperature and the stirring being regulated so that a fine emulsion of the "oil in water" type is formed, and separating the cyclodextrin-cholesterol and cyclodextrin-free fatty acid complexes so formed.

20 Claims, 2 Drawing Sheets

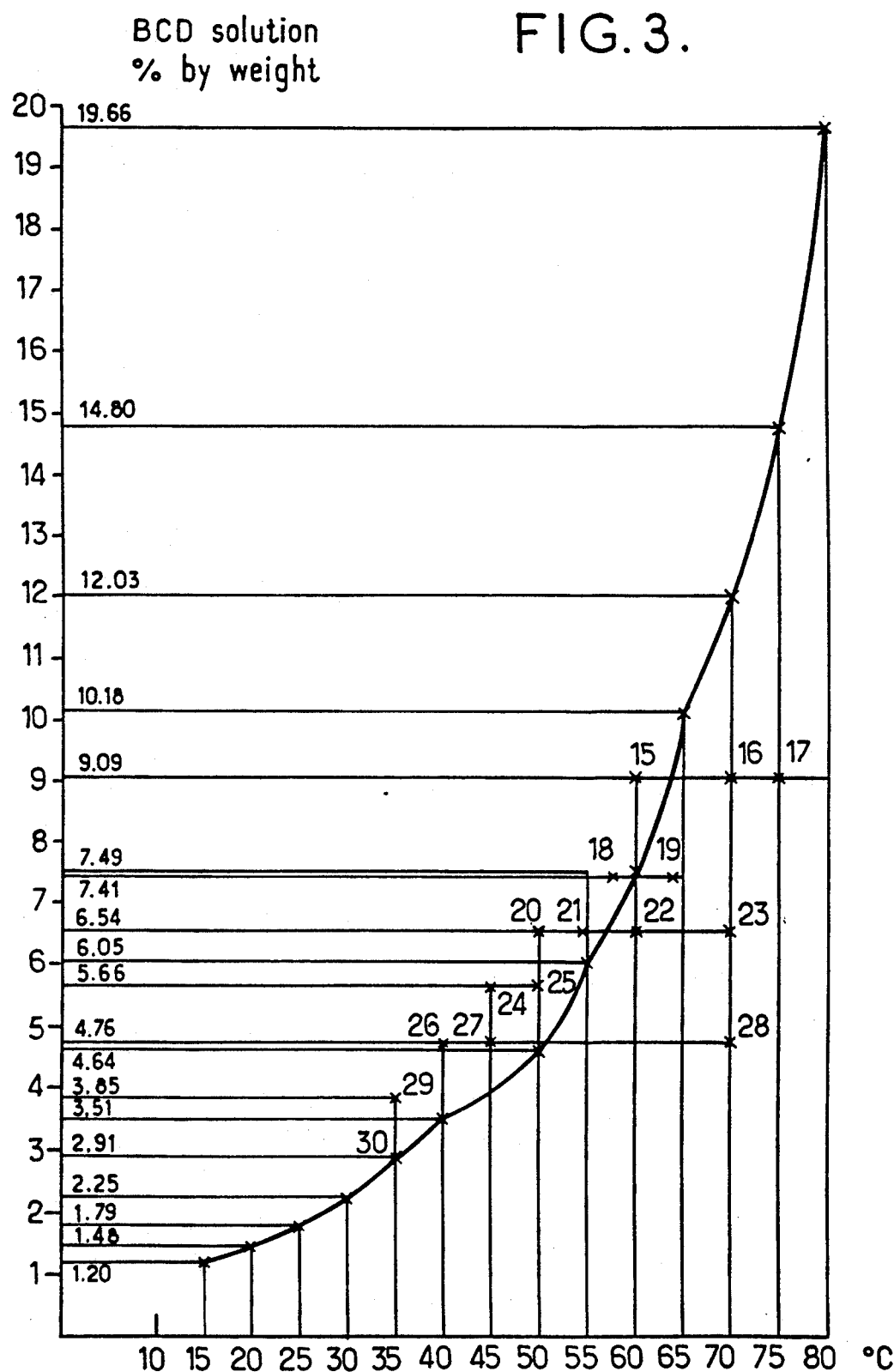

PROCESS FOR REDUCING THE CONTENT OF CHOLESTEROL AND OF FREE FATTY ACIDS IN AN ANIMAL FAT

This is a continuation of U.S. application Ser. No. 07/492,447, filed on Mar. 13, 1990, now abandoned.

BACKGROUND OF THE INVENTION

The present invention relates to a process for reducing the content of cholesterol and of free fatty acids in an animal fat and to the fat material so obtained.

Animal fats, like milk fat (butter, cream ...), suet and lard contain sterols and, in particular, cholesterol as well as free fatty acids.

In spite of its vital role, cholesterol is considered as being an element of risk for cardiovascular diseases, and the development of atherosclerosis in man has often been associated closely with the content of cholesterol in the blood.

Attempts have consequently been made to reduce the amount of cholesterol present in animal fats used in human food.

Cholesterol can be extracted by evaporation under high vacuum at a temperature of 240 to 280 degrees Celsius. This treatment results however in the loss of natural aromatic volatile elements which also evaporate.

The percolation of the fat at a temperature of 70 to 90 degrees Celsius over activated charcoal also enables reduction in the content of cholesterol but the activated charcoal also fixes other natural substances of the fat like especially aromatic components, antioxidants and color.

The extraction of cholesterol with carbon dioxide in supercritical conditions, that is to say at pressures above 100 bars, is a technique difficult to use industrially. Moreover the extraction of the cholesterol is not selective. For example, in the treatment of fat from milk, a considerable part of short chain triglycerides will also be extracted.

Patent application EP-A-0 256 911 describes a process for removing cholesterol from fats of animal origin, according to which the fluidized fat is contacted with a cyclodextrin; this contact is prolonged with stirring under a non-oxidizing atmosphere and at a temperature comprised between the melting point of the fat and 80 degrees Celsius for a period of 30 minutes to 10 hours, in the course of which complexes between the cholesterol and cyclodextrin would be formed, after which water is added and said complexes are extracted from the fat by entrainment into the aqueous phase so formed which is then separated from the fatty phase.

This process is not only relatively long but it only permits a limited reduction of the cholesterol content in a single operation. A single operation only permits in fact the removal of 18 to 33% of the initial cholesterol. To obtain a greater extraction, several successive operations must thus be carried out, if necessary, followed each time by a step of washing the lipid phase. With three successive extractions 41% of the initial cholesterol can be extracted. In theory, it would be possible in this way to remove up to 80% of the initial cholesterol. Furthermore no mention is made in EP-A-0 256 911 of any removal whatever of free fatty acids.

It is a object of the present invention to overcome the aforementioned drawbacks and to provide a process still based on extraction of cholesterol from animal fats by cyclodextrin, but arranged so that it enables, rapidly and efficiently, in a single operation, a considerable reduction of the content of cholesterol and at the same time an appreciable reduction of the content of free fatty acids in a fat of animal origin, to be achieved.

By fat of animal origin is meant particularly butter, dairy cream, anhydrous dairy fat, suet and lard.

GENERAL DESCRIPTION OF THE INVENTION

The process according to the invention consists of contacting the cyclodextrin and the fat in the presence of water, then of separating the complexes which are formed between the cyclodextrin and the cholesterol and the fatty acids, and it is essentially characterized by the fact that the ratio by weight water/fat is selected between 0.7/1 and 1.5/1, preferably between 0.7/1 and 1.5/1, and more preferably still close to 1/1.

Water is necessary so that the formation of the complexes may be achieved and it is particularly due to the choice of the ratio by weight water/fat in the aforesaid ranges that it is possible to obtain a very rapid and very effective extraction of the cholesterol and of the free fatty acids.

The water may be added separately or at the same time as the cyclodextrin. When it is added separately, this may be done before or after addition of the cyclodextrin to the fat. When it is added after the cyclodextrin, the formation of the complexes may already commence before the addition of the water but is only done slowly. It is only from the addition of the water that the formation of the complexes occurs more rapidly and more completely.

For this reason, it advantageous to add the water at the same time as the cyclodextrin, and in particular to dissolve the cyclodextrin beforehand in at least a fraction of this water.

Applicants have discovered that, and this is one of the advantageous aspects of the invention, that it was desirable to create an emulsion of the "oil in water" type in order that the extraction of cholesterol and of the free fatty acids may be most effective and as rapid as possible.

It appears that the cyclodextrin-cholesterol and cyclodextrin-free fatty acid complexes are formed at the "fat-aqueous solution" interface and it has been observed surprisingly and unexpectedly, that this complexation is effective very rapidly by arranging so that an emulsion of "oil in water" type be formed.

The parameters amount of water, stirring and temperature are hence selected so that this emulsion is formed, the object being to render it sufficiently "fine" in order to optimize the contacts between the cyclodextrin and cholesterol and the free fatty acids and thereby their complexation and then their extraction.

The complexation taking place within the emulsion, the contact time between the cyclodextrin and the fat before the addition of water may be reduced to zero, whereas, according to patent application EP-O-0 256 911, this contact time is at least 30 minutes and reaches in practice, in the embodiments given, 3 hours.

In the process described in this patent application, an "oil in water" emulsion is not formed, even after addition of water, given that the amount of water is too great, this amount of water affecting besides the stability of the complexes.

The ratio by weight between the amount of water and the amount of the fat is hence very important for obtaining the ideal emulsion of the "oil in water" type.

Moreover, too small an amount of water with respect to the amount of fat occasions the formation of too viscous an emulsion difficult to break subsequently.

According to one embodiment of the invention, the cyclodextrin is added to the fat in the absence of water, and the contact between cyclodextrin and the fat in the absence of water is maintained for a period less than 20 minutes and preferably less than 10 minutes.

According to another embodiment of the invention, the cyclodextrin is previously dissolved in the water before being mixed with the fat.

In the case where the fat from which the cholesterol and/or the free fatty acids must be extracted is in the form of an emulsion in the water, as is the case in particular for dairy cream, the cyclodextrin is preferably introduced in the form of powder into this emulsion, if necessary brought to a temperature suitable for facilitating the solubilization of the cyclodextrin in the aqueous phase.

According to an advantageous embodiment of the invention, the temperature of the fat-water-cyclodextrin medium is adjusted so that, for a selected concentration of cyclodextrin, this temperature is close to the solubility temperature of cyclodextrin in water for this concentration.

The amount of cyclodextrin used in accordance with the invention is comprised between 1% and 10% by weight with respect to the amount of fat, and preferably it is comprised between 3% and 8% by weight. Generally, it is advantageous to add amounts of cyclodextrin higher than 5% with respect to the amount of fat employed.

Different types of cyclodextrins or of modified cyclodextrins may be used in accordance with the invention. There may be mentioned, for example, α-, β- and γ-cyclodextrins, comprising respectively 6, 7, and 8 glucopyranose units joined together by α-1-4, bonds, as well as their respective derivatives like the hydroxyalkyl-cyclodextrins, the maltosyl-cyclodextrins, the glucosyl-cyclodextrins and the alkyl-cyclodextrins.

Preferably, β-cyclodextrin is used.

With an amount of β-cyclodextrin of more than 5% with respect to the fat, more than 96% and even practically 100% cholesterol contained in the fat can thus be removed by means of the process according to the invention.

The stirring of the medium fat/water/cyclodextrin is performed under sufficiently vigorous conditions to assure intimate contact between cyclodextrin and the fat and, according to the preferred embodiment of the invention, is performed so as to permit the formation of an emulsion of the "oil in water" type. It is desirable, as has been previously indicated, to obtain a fine emulsion, the fat globules dispersed in the aqueous phase having, mainly, a size less than 40 micrometers, even if some globules whose size may reach 100 micrometers, are still present.

This permits very rapid formation of cyclodextrin-cholesterol and cyclodextrin-free fatty acids complexes at the water/fat interface, intense stirring favoring the contacts at this interface. The complexes formed are concentrated in the aqueous phase where they are insolubilized.

The stirring must not however comprise too much shearing force since experiment has shown that these forces cause an increase in the viscosity of the emulsion, the latter then being difficult to break in the course of the subsequent step of separation of the phases.

An adapted stirring may be obtained, for example, by means of a helical stirrer rotating at high speed, preferably higher than 800 r.p.m. and in practice close to 2000 r.p.m. It is observed, when the stirring is adequate, that there is a change in the visual appearance of the medium constituted by the fat, the water and cyclodextrin. The color thus passes from a pale yellow scarcely homogeneous color, since it comprises some whitish streaks, to homogeneous milky yellow color.

By means of the choice of the ratio by weight water/fat within the aforesaid limits and due to the creation of an oil-in-water emulsion through the establishment of suitable stirring, excellent results of extraction of cholesterol and of free fatty acids may be obtained in a single operation with relatively short contact times, with ratios of use of cyclodextrin of the order of 5% with respect to the fat.

The temperature of formation of the emulsion is also important and, as previously indicated, it is quite advantageous to select it, for a given concentration of cyclodextrin, at a value relatively close to the solubility temperature of the cyclodextrin in water for this concentration.

If the temperature is too high, the desired emulsion is not formed and the formation of the complexes therefrom is affected. If this temperature is too low, there is a risk of recrystallisation of the β-cyclodextrin in the aqueous phase before formation of the complexes.

After many experiments, it has been found that the optimum temperature of the fat-water-cyclodextrin medium had to be selected in the vicinity of that corresponding to the solubility curve of cyclodextrin in water, and preferably at a value slightly less than the solubility temperature of the cyclodextrin for a selected concentration, so as to take into account the phenomenon of supercooling.

Without wishing to be bound by theory, it may be thought that the fact of regulating the temperature of the medium to a temperature close to the solubility limit of the cyclodextrin, and preferably slightly less than the latter, facilitates the precipitation or the crystallisation of the cyclodextrin-cholesterol complexes and of the cyclodextrin-free fatty acid complexes.

The choice of the amount of water and of the temperature, for a given amount of cyclodextrin, is hence important to ensure the most effective extraction of cholesterol. It seems that the complexes formed must remain insoluble in the aqueous phase.

The values of the solubility of β-cyclodextrin in water, in function of temperature, according to J. SZEJTLI in "Cyclodextrins and their inclusion complexes", Akademiai Kiado, Budapest 1982, are given in the table below:

| Grams of β-cyclodextrin in 100 ml of solution | Temperature in degrees Celsius |
| --- | --- |
| 1.20 | 15 |
| 1.48 | 20 |
| 1.79 | 25 |
| 2.25 | 30 |
| 3.51 | 40 |
| 4.64 | 50 |
| 6.05 | 55 |
| 7.49 | 60 |
| 10.18 | 65 |
| 12.03 | 70 |
| 14.80 | 75 |

| Grams of β-cyclo-dextrin in 100 ml of solution | Temperature in degrees Celsius |
|---|---|
| 19.66 | 80 | and the corresponding solubility curve is shown in FIG. 3.

In practice, if one calls T the solubility temperature of cyclodextrin, it is possible to select the temperature of the medium fat-water-cyclodextrin within a range of T−15° C. to T+15° C., preferably of T−15° C. to T+10° C. Generally, a temperature will however be chosen which is not greater by more than 5° C. than said solubility temperature.

With a ratio by weight of water/fat fixed within the limits indicated, adequate stirring and the temperature of the emulsion selected within the limits defined above of the solubility curve of cyclodextrin, it is observed that the formation of the fine "water in oil" emulsion sought is practically instantaneous and that the formation of the complexes is very rapid.

Nonetheless, it is possible to allow the stirring and hence the contact between the cyclodextrin, water and fat to continue for about 1 to 20 minutes and preferably for about 5 to 10 minutes to be certain that the formation of the complexes is essentially complete.

By means of the process according to the invention, the contact time between the cyclodextrin, the water and the fat can hence be very short, and this constitutes obviously an essential advantage with respect to the processes of the prior art.

Another essential advantage resides in the fact that the process can be conducted in a normal atmosphere, and it is not necessary to resort to a non-oxidizing atmosphere, as is the case for the process described in patent application EP-A-0 256 911.

After the formation of the complexes, the aqueous phase and the lipid phase may be separated by any known means such as centrifugation or decantation, centrifugal epuration being preferred.

The epuration is conducted at a temperature higher than the melting point of the fat and preferably at a temperature relatively close, but preferably below, the temperature employed in the formation of the complexes.

A temperature of about 40° C.–45° C. can thus be used for effective separation of the aqueous and lipid phases as well as of the soluble complexes formed.

Preferably, a step of cooling the fat-water-cyclodextrin mixture is inserted between the step of formation of the complexes and the separation step proper, in order to stabilize the complexes formed by insolubilizing them more completely. Thus, the mixture concerned is first cooled, for example, to a temperature of 25°–35° C. preferably about 30° C., in order to perfect the insolubilization of the complexes formed, then it is again heated to reach the separation temperature selected which is, as indicated previously, advantageously equal to about 40°–45° C.

Given the presence of insoluble substances in the water, in particular the complexes formed, the separation can be performed advantageously in a centrifuge enabling frequent removal of the deposits.

The latter are constituted essentially of cyclodextrin which has encapsulated principally the cholesterol and the free fatty acids.

The aqueous phase contains a small amount of dry matter, composed essentially of cyclodextrin.

The fat reduced in cholesterol and in free fatty acids still contains a little water, generally of the order of 0.5%. It can be reheated and treated by evaporation under vacuum to bring it to 99.9% purity.

After the separation of the aqueous phase and of the fatty phase, the fatty phase can be subjected to washing with water followed by a further centrifugal separation of the phases so obtained.

Separation of the aqueous and lipid phases after the formation of the complexes, may also be performed by means of the technique of churning the cooled emulsion, and this churning can moreover be followed if necessary by melting the fat and centrifugal epuration.

According to this technique, a cooling of the emulsion formed in accordance with the invention between the fat, the cyclodextrin and the water, is first effected, then it is left to mature for some hours at a temperature of at the most 10° C., after which the churning follows.

The cooling and the physical maturation of the emulsion have the purpose of crystallising at least in part, the fat, the partially solid state of the fat being required for the following operation of churning. This step at low temperature also enables stabilisation of the complexes by insolublizing them more completely.

The churning can be done on a conventional dairy churn (batch-wise churn) but a continuous butter maker can also be employed.

The emulsion is churned at low temperature, preferably below about 10° C.; the grains of fat, in particularly of butter, obtained are then washed and mixed and then the fat is stored in the cold before its possible subsequent treatment. The aqueous phase coming from this churning is poor in fat.

The fat coming from this step of churning in the cold can then be if necessary melted and reheated, for example at a temperature of about 45° C., before being subjected to a centrifugal purification in order to remove more completely the residues of cyclodextrin and the complexes which it can still contain.

In the same way as previously, it is possible as needed to subject the fatty phase to washing with water before centrifugal epuration.

It may be mentioned that when the fat is constituted by anhydrous dairy fat (ADF) or dairy cream, there is already obtained at the end of the churning step, a butter with a reduced content of cholesterol and of free fatty acids which can be marketed as is or which can serve, after extraction and evaporation of water for the preparation of ADF with a reduced content of cholesterol and of free fatty acids.

BRIEF DESCRIPTION OF THE DRAWINGS

In the drawings.

FIG. 3 shows graphically the various conditions of temperature and the proportions of BCD (β-cyclodextrin) relating to some of the examples described below.

DESCRIPTION OF PREFERRED EMBODIMENTS

Figure 1:
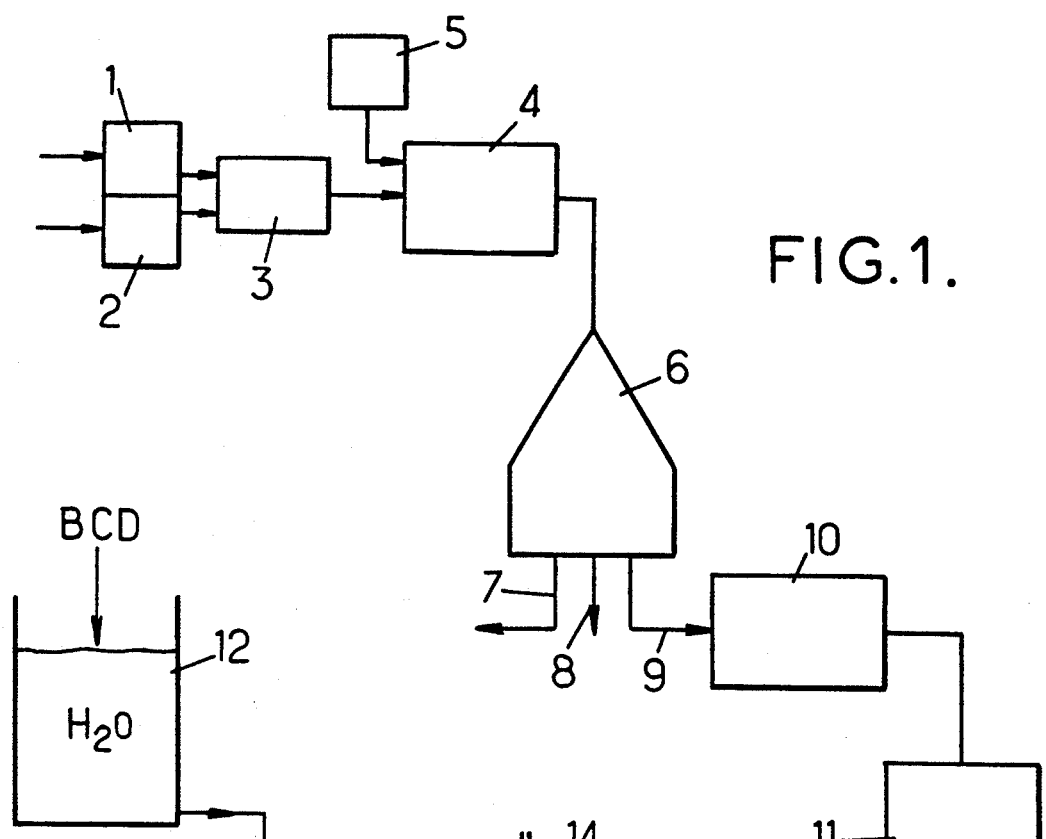
FIG. 1 shows diagrammatically an embodiment of an installation for practising the process according to the invention continuously.

The process according to the invention can be carried out continuously, by means of an installation as shown diagrammatically in FIG. 1. This installation comprises a device 1 for measuring out the β-cyclodextrin and a device 2 for measuring out water. The β-cyclodextrin is dissolved in the water measured out in the tank 3. The solution is introduced into the contacting and stirring device 4. Fat heated and measured out in the measuring device 5 is sent also to the device 4. The fatty and aqueous phases emerging from the device 4 can be separated in the cleansing centrifugal separator 6. The aqueous phase emerges at 7, the complexes at 8 and the fatty phase at 9. This latter phase is re-heated in the device 10 and evaporated under vacuum in the evaporator 11.

Figure 2:
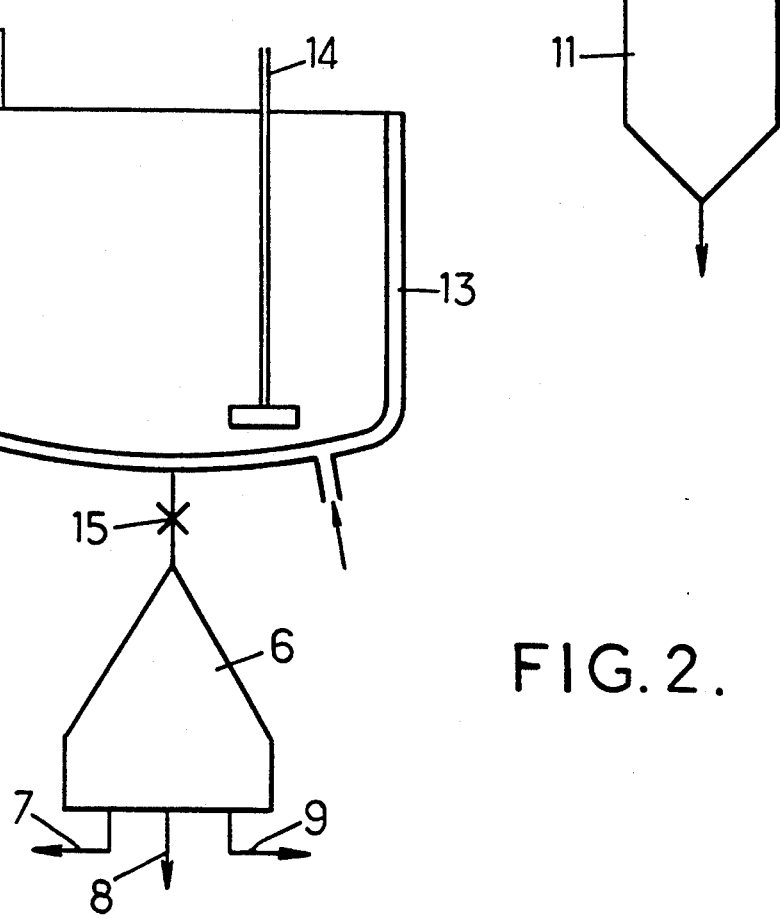
FIG. 2 shows an embodiment of an installation for practising the process according to the invention, in batch-wise manner.

The process may also be carried out, partially or completely, batch-wise, by means, for example, of an installation shown diagrammatically in FIG. 2, which comprises a tank 12 for the preparation of the cyclodextrin solution (BCD), a reaction tank 13, comprising a double wall in which hot water can flow, a helical stirrer 14 and a drain cock 15, and a centrifugal separating apparatus 6.

To illustrate the invention more concretely, processing examples, some carried out according to the invention and others given by way of comparison, are given below.

The methods of analysis used in these examples are as follows. For the determination of the cholesterol:
  analysis of the sterols by precipitation with digitonin (the cholesterol represents 98% of the sterol fraction in the ADF);

For the determination of the free fatty acids:
  titration of the acidity of samples of ADF dissolved in a neutral mixture of petroleum ether and isopropanol (titration with n-tetrabutyl-hydroxyammonium using thymol blue as indicator).

EXAMPLE 1

1 kg of ADF at 45° C. is poured into a glass reaction tank of 5 liters capacity and equipped with a double wall, with a variable speed helical stirrer and a drain cock. Water at 45° C. flows in the double wall of the stirring tank in order to ensure thermostatization.

To the ADF is added 50 g (namely 5% by weight with respect to the fat) of β-cyclodextrin which is distributed uniformly in the lipid phase by the stirring. The suspension formed is kept stirred for 1 minute.

After this contact time of 1 minute between the ADF and the β-cyclodextrin, to the suspension is added 1 liter of water kept at 55° C. The stirring speed is increased in order to cause intimate mixing of the phases and the creation of water-oil interface sufficiently large to form complexes between the cyclodextrin and the cholesterol as well as the free fatty acids, and move them towards the aqueous phase.

The maximum temperature reached by the mixture is 50° C. The step of contacting by stirring in the presence of water lasts 10 minutes.

The mixture is then treated continuously in a centrifugal separator in order to separate the phases (lipid phase, aqueous phase and β-cyclodextrin which has encapsulated the cholesterol and the free fatty acids). The insoluble complexes are deposited on the inner wall of the separator and are recovered after stopping and opening the latter. The duration of the centrifugal separation step is about 8 minutes. Under these separation conditions, the fatty phase recovered contains about 0.2% of humidity. By evaporation under vacuum, it is possible to bring this humidity level to a value below 0.1%. No additional operation of washing the ADF recovered was carried out. It will be seen in Example 14 below that this washing operation is not really indispensable as regards the quality of purification.

EXAMPLES 2 to 6

The conditions used in these Examples are identical with those of Example 1, with the exception of the contacting time between the ADF and the β-cyclodextrin which is taken respectively to 5 minutes, 10 minutes, 20 minutes, 40 minutes and 120 minutes.

The results obtained, as regards the contents of cholesterol and of free fatty acids before and after treatment, are summarized in Table 1 below.

It will be noted that for this ratio by weight water/fat=1/1, and for a contact time in the presence of water of only 10 minutes, very satisfactory ratios of the reduction of the content of cholesterol are obtained which can reach about 70%.

The reduction ratio of the percentage of free fatty acids for its part is from about 30 to 40%.

This series of tests shows in addition that the contact time between the cyclodextrin and the fat, in the absence of water, has very little influence on the results obtained since it is observed that for very short times, of the order of 1 minute and 5 minutes, the reduction ratios obtained are already from 65 to 71%. It appears even that longer contact times are rather harmful from the point of view of the yield of extraction of the cholesterol and of the free fatty acids.

This example is obviously for comparison with the examples of the patent application EP 0 256 911, according to which there is only obtained, in a single operation, a yield of removal of the cholesterol of 26% after 3 hours contact between the cyclodextrin and the fat in the absence of water, followed by 3 hours contact under stirring in the presence of water, the ratio by weight water/ADF being 10/1.

TABLE I

| | | t without water (min) | t with water (min) | % Cholesterol | | | % Fatty Acids | | |
|---|---|---|---|---|---|---|---|---|---|
| EX No | H₂O/ADF | | | Initial Content | Content after Treatment | % Reduction | Initial Content | Content after Treatment | % Reduction |
| 1 | 1/1 | 1 | 10 | 0,31 | 0,11 | 65 | 0,24 | 0,15 | 38 |
| 2 | 1/1 | 5 | " | 0,31 | 0,09 | 71 | 0,24 | 0,15 | 38 |
| 3 | 1/1 | 10 | " | 0,31 | 0,10 | 68 | 0,24 | 0,16 | 33 |
| 4 | 1/1 | 20 | " | 0,31 | 0,13 | 58 | 0,24 | 0,16 | 33 |
| 5 | 1/1 | 40 | " | 0,31 | 0,13 | 58 | 0,24 | 0,15 | 38 |
| 6 | 1/1 | 120 | " | 0,29 | 0,13 | 55 | 0,21 | 0,16 | 24 |
| 7 | 2/1 | 10 | 10 | 0,31 | 0,23 | 26 | 0,24 | 0,17 | 29 |
| 8 | 3/1 | " | " | 0,31 | 0,26 | 16 | 0,24 | 0,18 | 25 |
| 9 | 4/1 | " | " | 0,31 | 0,28 | 10 | 0,24 | 0,18 | 25 |
| 10 | 5/1 | " | " | 0,31 | 0,27 | 13 | 0,24 | 0,19 | 21 |
| 11 | 6/1 | " | " | 0,31 | 0,27 | 13 | 0,24 | 0,18 | 25 |
| 12 | 10/1 | " | " | 0,29 | 0,27 | 7 | 0,21 | 0,16 | 24 |

TABLE I-continued

| EX No | H₂O/ADF | t without water (min) | t with water (min) | % Cholesterol Initial Content | % Cholesterol Content after Treatment | % Reduction | % Fatty Acids Initial Content | % Fatty Acids Content after Treatment | % Reduction |
|---|---|---|---|---|---|---|---|---|---|
| 13 | 1/1 | 10 | 10 | 0,27 | 0,19 | 30 | 0,16 | 0,15 | 6 |
| 14 | 1/1 | 5 | 10 | 0,27 | 0,08 | 70 | nd | nd | nd | nd: not determined

EXAMPLES 7 to 12

These Examples are for the purpose of demonstrating the influence of the ratio by weight of water/ADF.

Examples 1 to 6 have been carried out by using a ratio by weight water/ADF of 1/1. The Examples below show the negative influence of a ratio by weight water/ADF which is too high.

The operational conditions were identical with those of Example 3, that is to say contact time between the β-cyclodextrin and the ADF, in the absence of water, of 10 minutes, percentage cyclodextrin 5% by weight with respect to the fat, contact time under stirring, in the presence of water, 10 minutes, temperature of the mixture about 50° C. The amounts of water and of ADF containing 5% of β-cyclodextrin were the following for each of the Examples:

| | |
|---|---|
| Example 7: | 2 kg of water per 1 kg of ADF containing 50 g of cyclodextrin |
| Example 8: | 3 kg of water for 1 kg of ADF containing 50 g of β-cyclodextrin |
| Example 9: | 2 kg of water for 0.5 kg of ADF containing 25 g of β-cyclodextrin |
| Example 10: | 2.5 kg of water for 0.5 kg of ADF containing 25 g of β-cyclodextrin |
| Example 11: | 3 kg of water for 0.5 kg of ADF containing 25 g of β-cyclodextrin |
| Example 12: | 3 kg of water for 0.3 kg of ADF containing 15 g of β-cyclodextrin |

The results obtained from these Examples 7 to 12 are given in Table I.

It can be noted that, all conditions being otherwise equal, the ratio by weight water/ADF enormously influenced the extraction yields obtained. In fact, the percentage reduction of cholesterol passes thus from 68% in Example 3, performed with a ratio H₂O/ADF of 1/1, to 26% in Example 7, where this ratio was brought to 2/1. The percentage reduction of the cholesterol diminishes then progressively with the increase in the ratio water/fat.

The development appeared less sensitive on the percentage reduction of the free fatty acids, but the optimum was here also obtained for a ratio water/fat in the vicinity of 1/1.

EXAMPLE 13

The operational conditions were identical with those of Example 2, with the exception of the method of separation of the phases which was carried out here by decantation, and not by centrifugal separation, this decantation being followed by three washing steps by means of 1 kg of water at 55° C. for each washing. The washing operations were employed in order to remove a maximum of complex β-cyclodextrin, considering that the amount of residual water in the decanted fatty phase was distinctly greater than in the case of centrifugal separation (about 15% in 10 minutes for decantation against 0.2% for centrifugation.

After the last washing the fat phase was finally treated by evaporation under vacuum to remove the last fraction of water.

The result obtained for the extraction of cholesterol and of the free fatty acids is also given in Table I.

EXAMPLE 14

The conditions were identical with those of Example 3, with the exception of an additional washing step by means of 1 kg of water at 5° C. after the centrifugal separation step of the phases. The washing water was separated from the purified ADF by a further centrifugal separation. The results obtained are also given in Table I. It is observed that in this case the additional washing brings little improvement in the extraction ratio of cholesterol.

EXAMPLE 15

The conditions are identical with those of Example 1, apart from the fact that the ADF was at a temperature of 35° C. and that 1,900 cm³ of water kept at 35° C. were added to the ADF-cyclodextrin mixture.

The maximum temperature reached by the mixture was 35° C. and the step of contact under stirring and in the presence of water lasted 10 minutes.

The centrifugal separation was performed under the same conditions as in Example 1, and a ratio of reduction of the cholesterol of 54% was obtained. This Example shows that by modifying the temperature of performing the fat-water-cyclodextrin mixing, it is possible to obtain acceptable results even with water/fat ratios by weight which are so high. To the extent that the temperature of the mixture could be further lowered, taking into account especially the temperature of solidification of the treated substance, the invention enabled, in an advantageous embodiment, the water/fat ratio to be taken to values higher than 1.9, even higher than 2.

EXAMPLES 16 to 31

Examples 16 to 31 were performed by means of the installation shown diagrammatically in FIG. 2.

A quantity of β-cyclodextrin was dissolved in 1.5 kg of water in the tank 12.

A quantity of ADF equal to the amount of water was placed in the reaction tank 13 and then was fluidized, if it had not been done before, by the hot water which flowed in the double wall of the tank 13.

The solution of β-cyclodextrin was mixed with the liquefied ADF and the mixture was vigorously stirred with a helical stirrer 14 mounted excentrically in the tank 13 and rotating at a speed of 2,000 rpm. The contents of the tank 13, that is to say the emulsion formed, was maintained at a predetermined temperature by the hot water which flowed in the double wall of the tank 13.

After about 10 minutes mixing, the tank 13 was emptied through the drain cock 15 and the aqueous and fatty phases were separated in a centrifugation apparatus 6. Considering that these Examples are tests carried out on laboratory scale, this centrifugal separation was performed by means of a creamer of the ALFA-LAVAL 100 AE type. On the industrial scale a centrifugal purification can be used. All this was repeated for different amounts of β-cyclodextrin, as well as for different temperatures of the emulsion.

The amounts of β-cyclodextrin and these temperatures, as well as the results obtained for the extraction of the cholesterol and of the free fatty acids, are given in Table II below.

The various conditions of temperature and proportion of β-cyclodextrin relating to Examples 16 to 31 have also been indicated in FIG. 3.

From these Examples it emerges clearly that a very considerable reduction of the ratios of cholesterol and of free fatty acids is obtained when, for a predetermined amount of β-cyclodextrin, the temperature is close to the solubility curve, and also if the amount of β-

| water | 54.8% |
| fat | 40.0% |
| lactose | 2.8% |
| proteins | 2.0% |
| ash | 0.4% |

In Example 36, dairy cream was first concentrated to 50% fat in order to respect the operational conditions regarding the amount of aqueous phase; this concentration was carried out by creaming off at 55° C. on an ALFA LAVAL 100 AE laboratory creamer.

After this creaming off, the cream with 50% fats was supplemented with β-cyclodextrin powder for a content of 3.5% on the cream (namely 7% expressed on the fat or 6.54% expressed on the aqueous phase including here the β-cyclodextrin). This addition was made to the cream at 55° C. The cream was then

TABLE II

| EX No | ADF (kg) | Water (kg) | BCD SOLUTION (kg) | BCD/ADF % | % BCD in aqueous sol. | TEMP emul. (°C.) | CHOLESTEROL % before treatmnt | CHOLESTEROL % after treatmnt | % reduc. | FREE FATTY ACIDS % before treatmnt | FREE FATTY ACIDS % after treatmnt | % reduc. |
|---|---|---|---|---|---|---|---|---|---|---|---|---|
| 16 | 1.5 | 1.5 | 0.150 | 10 | 9.09 | 60 | 0.302 | 0.006 | 98 | 0.36 | 0.20 | 44 |
| 17 | 1.5 | 1.5 | 0.150 | 10 | 9.09 | 70 | 0.304 | 0.040 | 87 | 0.26 | 0.14 | 46 |
| 18 | 1.5 | 1.5 | 0.150 | 10 | 9.09 | 75 | 0.293 | 0.262 | 11 | 0.29 | 0.27 | 7 |
| 19 | 1.5 | 1.5 | 0.120 | 8 | 7.41 | 58 | 0.304 | 0.000 | 100 | 0.26 | 0.12 | 54 |
| 20 | 1.5 | 1.5 | 0.120 | 8 | 7.41 | 63 | 0.304 | 0.025 | 92 | 0.26 | 0.13 | 50 |
| 21 | 1.5 | 1.5 | 0.105 | 7 | 6.54 | 50 | 0.258 | 0.004 | 98 | 0.19 | 0.08 | 58 |
| 22 | 1.5 | 1.5 | 0.105 | 7 | 6.54 | 54 | 0.258 | 0.003 | 99 | 0.19 | 0.10 | 47 |
| 23 | 1.5 | 1.5 | 0.105 | 7 | 6.54 | 60 | 0.304 | 0.063 | 79 | 0.26 | 0.15 | 42 |
| 24 | 1.5 | 1.5 | 0.105 | 7 | 6.54 | 70 | 0.304 | 0.119 | 61 | 0.26 | 0.18 | 31 |
| 25 | 1.5 | 1.5 | 0.090 | 6 | 5.66 | 45 | 0.258 | 0.060 | 77 | 0.19 | 0.09 | 53 |
| 26 | 1.5 | 1.5 | 0.090 | 6 | 5.66 | 50 | 0.303 | 0.013 | 96 | 0.24 | 0.12 | 50 |
| 27 | 1.5 | 1.5 | 0.075 | 5 | 4.76 | 40 | 0.258 | 0.079 | 69 | 0.19 | 0.08 | 58 |
| 28 | 1.5 | 1.5 | 0.075 | 5 | 4.76 | 45 | 0.333 | 0.080 | 76 | 0.37 | 0.24 | 35 |
| 29 | 1.5 | 1.5 | 0.075 | 5 | 4.76 | 70 | 0.279 | 0.244 | 13 | 0.24 | 0.20 | 17 |
| 30 | 1.5 | 1.5 | 0.060 | 4 | 3.85 | 35 | 0.258 | 0.117 | 55 | 0.19 | 0.08 | 58 |
| 31 | 1.5 | 1.5 | 0.045 | 3 | 2.91 | 35 | 0.258 | 0.164 | 37 | 0.19 | 0.14 | 26 | cyclodextrin is greater than 5% with respect to the amount of fat.

In Examples 18 and 29, the fine "oil in water" emulsion is not formed, whence the poor results obtained.

In Examples 16, 19 to 22, and 26, where the temperatures employed are close to the solubility temperatures of the β-cyclodextrin, practically all of the cholesterol is extracted.

Good results are also obtained when the temperature is slightly greater than the solubility temperature, as in Examples 20 and 23, but it is observed however that it is preferable to select a temperature slightly below the solubility temperature of cyclodextrin.

EXAMPLES 32 to 35

With the same installation as that employed for Examples 16 to 31, similar tests were performed with refined beef fat and refined lard instead of ADF.

The operational conditions and the results of the extractions are given below in Table III for the beef fat and in Table IV for the lard.

It will be noted that results are quite conclusive, both as regards the extraction of cholesterol and that of free fatty acids.

EXAMPLES 36 to 38

In addition to tests carried out on pure fats (ADF, beef fat and lard), tests were also performed successfully on fresh dairy cream.

Fresh dairy cream has the following average composition:

cooled to 50° C. in the reaction tank and based under stirring at 2,000 rpm.

After about 10 min of mixing, the cream was concentrated to 70% of fat by a further passage over the laboratory creamer. A deposit of complexed β-cyclodextrin was obtained on the inner wall of the bowl of the creamer.

Finally, the cream with 70% of fat, so treated was cooled, matured in the refrigerator overnight and churned. The fat from the butter obtained by this churning was subjected to analysis of the sterols and of the free fatty acids. The results of the extraction of these compounds from the fatty material were excellent, as is shown by the results presented in Tables V and VI below.

In Example 37, 3 kg of dairy cream with 38% of fat were directly supplemented with 79.8 g of β-cyclodextrin (namely 7% expressed on the fat or 4.11% expressed on the aqueous phase including here the β-cyclodextrin). This addition was made to the cream at 55° C.

The cream was then brought back to 50° C. in the reaction tank and placed under stirring at 2,000 rpm.

After 10 minutes mixing at 50° C., the cream was cooled to a temperature below 10° C. by passage through a tubular exchanger.

This treated cream was then churned after a night of maturation in the refrigerator. The operational conditions as well as the results of analysis of the sterols (cholesterol) and of the free fatty acids of the fat of the butter obtained by this churning are supplied in Tables V and VI.

In Example 38, 3kg of dairy cream with 42.4% of fat were supplemented directly with 63.5 g of β-cyclodextrin (namely 5% expressed on the fat or 3.54% expressed on the aqueous phase including here the β-cyclodextrin). This addition was made to the cream at 55° C.

The cream was then brought back to 45° C. in the reaction tank and placed under stirring at 2,000 rpm.

1,500 kg per hour, and the aqueous solution of β-cyclodextrin at 65° was brought into the same tank at a flow rate of 1,605 kg per hour, the flow rates being regulated by means of pumps servo-coupled through weight operated flow meters. The emulsion was formed by stirring at a temperature of 55° C., and the dwell time in tank 4 was about 3 minutes.

TABLE V

| EX No | CREAM (kg) | % FAT of the cream | (kg) | B-CYCLODEXTRIN ADDED BCD/CREAM % | BCD/FAT % | BCD/aqueous phase with BCD in % | MIXING TEMPERATURE (°C.) |
|---|---|---|---|---|---|---|---|
| 36 | 3.0 | 50 | 0.105 | 3.5 | 7 | 6.54 | 50 |
| 37 | 3.0 | 38 | 0.0798 | 2.67 | 7 | 4.11 | 50 |
| 38 | 3.0 | 42.4 | 0.0635 | 2.12 | 5 | 3.54 | 45 |

TABLE VI

| CHOLESTEROL | FATTY ACIDS |
|---|---|

TABLE III

| | BEEF | | BCD | | % BCD | TEMP. | CHOLESTEROL | | | FREE FATTY ACIDS | | |
|---|---|---|---|---|---|---|---|---|---|---|---|---|
| EX No | FAT (kg) | WATER (kg) | SOLUTION (kg) | BCD/MG % | in aqueous sol. | emul. (°C.) | % before treatmnt | % after treatmt | % reduc. | % before treatmnt | % after treatmt | % reduc. |
| 32 | 1.5 | 1.5 | 0.075 | 5 | 4.76 | 45 | 0.108 | 0.030 | 72 | 0.09 | 0.05 | 44 |
| 33 | 1.5 | 1.5 | 0.105 | 7 | 6.54 | 55 | 0.108 | 0.018 | 83 | 0.09 | 0.03 | 67 |

TABLE IV

| | | | BCD | | % BCD | TEMP. | CHOLESTEROL | | | FREE FATTY ACIDS | | |
|---|---|---|---|---|---|---|---|---|---|---|---|---|
| EX No | LARD (kg) | WATER (kg) | SOLUTION (kg) | BCD/MG % | in aqueous sol. | emul. (°C.) | % before treatmnt | % after treatmt | % reduc. | % before treatmnt | % after treatmt | % reduc. |
| 34 | 1.5 | 1.5 | 0.075 | 5 | 4.76 | 45 | 0.106 | 0.036 | 66 | 0.06 | 0.04 | 33 |
| 35 | 1.5 | 1.5 | 0.105 | 7 | 6.54 | 55 | 0.106 | 0.026 | 75 | 0.06 | 0.03 | 50 |

After 10 minutes mixing at 45° C., the cream was cooled to a temperature below 10° C. by passage through a tubular exchanger.

After one night of maturation in the refrigerator and churning of the cream, the results of extraction of the cholesterol and of the free fatty acids presented in Table VI were obtained on the fat of the butter derived from the churning. The operational conditions are supplied in Table V.

EXAMPLE 39

This Example illustrates the extraction of the cholesterol and of the free fatty acids from ADF, continuously and in an installation such as that shown in FIG. 1.

The separation of the fatty and aqueous phases was in this case performed by centrifugation.

ADF comprising a fat content greater than 99% was thus brought into the tank 5 kept at 40° by circulation of hot water, at a flow rate of 1,500 kg per hour.

In parallel, the β-cyclodextrin solution was prepared continuously and with stirring in the dissolving tank 3. The water was added continuously to this tank, with a flow rate of 1,500 kg per hour by means of a pump servo-coupled through a weight operated flow meter. Powdered β-cyclodextrin was added continuously to this tank 3 by means of a powder distributor, the flow rate being regulated to 105 kg per hour. The solution of the β-cyclodextrin occurs at 65° C. and for about 6 minutes.

An emulsion of the oil-in-water type between the ADF and the aqueous solution of β-cyclodextrin was then produced with stirring and continuously in the emulsion tank 4. To do this, the ADF at 40° was brought continuously into the tank 4 at a flow rate of

| EX No | % before treatment | % after treatment | % reduc. | % before treatment | % after treatment | % reduc. |
|---|---|---|---|---|---|---|
| 36 | 0.288 | 0.009 | 97 | 0.35 | 0.10 | 71 |
| 37 | 0.290 | 0.008 | 97 | 0.25 | 0.04 | 84 |
| 38 | 0.300 | 0.023 | 92 | 0.24 | 0.11 | 54 |

The emulsion is pumped from the emulsion tank 4 by means of a positive pump whose delivery rate is adjusted to the sum of the delivery rates of ADF and the aqueous solution of β-cyclodextrin and it passes through a first plate exchanger where it is cooled from 55° C., to a temperature below 30° C., this cooling is to stabilize the complexes by insolubilizing them more completely. It then passes through a second plate exchanger where it is reheated to 42° C., that is to say, to a temperature intermediate between the melting point of the fat and the formation temperature of the emulsion.

The emulsion containing about 50% of fat is then destabilised in a first contrifugal concentrator which concentrates the lipid phase to about 80%; the aqueous phase containing practically no fat is not recycled; the insoluble phase, that is to say the complexes formed, forms a deposit in the bowl of the machine and this deposit is ejected through the opening of the bowl at regular intervals.

The lipid phase containing about 80% of fat is pumped to a first centrifugal purifier where it is concentrated to about 99.2%. A further smaller deposit, of insoluble phase, is also formed in the bowl of this second centrifugal machine. This deposit is also ejected at regular intervals through the opening of the bowl. The aqueous phase collected contains about 30% of fat and this phase may be concentrated to about 75% of fat in a second centrifugal concentrator to be recyclable upstream of the first centrifugal machine.

The fatty phase is finally concentrated to 99.9% of fat by treatment in the vacuum evaporator 11; this operation is carried out at 75° C. under a vacuum of 20 torrs and provides ADF with a reduced content of cholesterol and of free fatty acids, since the ratio of cholesterol reduction reaches, under these conditions, more than 85%.

EXAMPLE 40

This example is identical with the preceding one, apart from the fact that the separation of the aqueous and lipid phases is done henceforth by churning, followed by centrifugal epuration.

At the output from the tank 4, the emulsion is sent to a heat exchanger where it is cooled, then the cold emulsion is sent to a physical maturation tank where it is kept for about 12 hours at a temperature below 10° C.

After this physical maturation which is to crystallize the fat and stabilise the complexes, the cold emulsion is sent to the churn which in the event is a conventional butter churn (batch-wise churn). The emulsion is churned at a temperature of 10° C.; the "butter grain" obtained is then washed and kneaded; the butter is stored cold before its subsequent treatment; the aqueous phase coming from this churning is poor in fat.

The "butter" containing about 80% of fat is then melted and reheated in a grid melter, and the temperature of the melted butter is stabilised at about 45° C.

The melted butter containing about 70 to 80% of fat from the milk is then pumped to a first centrifugal empurator where the lipid phase is concentrated to about 99.2% of fat; an insoluble phase deposit is formed in the bowl of the machine, which deposit is ejected at regular intervals through the opening of the bowl. The aqueous phase collected contains about 30% of fat and it can be concentrated to about 75% of fat in a centrifugal concentrator to be recyclable upstream of the first empurator.

The lipid phase can then be evaporated under vacuum under the same conditions as with the preceding example, to obtain an ADF with 99.9% of fat with a reduced content of cholesterol and of free fatty acids. The percentage reduction of the cholesterol is, under these conditions, more than 85%.

EXAMPLE 41

In this example a continuous operation is described starting from dairy cream with 40% fat, separation of the phases being performed by centrifugal epuration.

The cold cream to be treated is first of all heated to 65° C. in a plate exchanger and supplies the treatment line through a buffer tank.

The solution of the β-cyclodextrin in the aqueous phase of the hot cream is carried out continuously and with stirring in the solution tank 3.

The cream is brought continuously into this tank, at a flow rate of about 3000 kg/hour by means of a pump servo-coupled through a 'weight controlled' flow meter. The β-cyclodextrin in powder form is added continuously to the same tank by means of a powder distributor, the flow rate being regulated to 84 kg/hour. The solution of the β-cyclodextrin is performed at 65° C. for about 3 minutes.

The cream containing this β-cyclodextrin is then cooled to 55° C. in a plate exchanger and then is sent continuously by means of a pump servo-coupled through a weight controlled flow meter into the emulsion tank 4 where it remains under stirring for about 3 minutes. These conditions of temperature, time and stirring enable the β-cyclodextrin complexes to be formed.

The emulsified cream is then pumped from the emulsion tank 4 by means of a positive pump whose flow rate is regulated to the flow rate of the feed pump of the emulsion tank. It passes through a first plate exchanger where it is cooled from 55° C., to a temperature below 30° C., then through a second plate exchanger where it is heated to 55° C. The emulsified cream containing about 40% of fat from the milk is sent to the first centrifugal concentrator which concentrates the lipid phase to about 80%. The aqueous phase, or buttermilk, is collected at the water outlet of the concentrator and contains very little fat; this aqueous phase is not recycled into the line; the insoluble phase, that is to say the complexes, form a deposit in the bowl of the machine, which deposit is ejected through the opening of the bowl at regular intervals.

The lipid phase of the cream containing about 80% of fat from the milk has not been destabilised in the first centrifugal concentrator and is still present in the form of a emulsion of the cream type. An inversion of the phases is then performed, and the concentrated and inverted emulsion is pumped to a centrifugal empurator where it is concentrated to about 99.2%. A smaller deposit of insoluble phase is formed again in the bowl and it is ejected at regular intervals through the opening of the latter. The aqueous phase collected, or buttermilk, which contains about 30% of fat, is concentrated up to 75% of fat by means of a second centrifugal concentrator and is recycled upstream of the first centrifuge machine.

The fatty phase is then concentrated to 99.9% of fat by treatment in a vacuum evaporator, this operation being carried out under the same conditions as in the preceding examples. In this way an ADF with very much reduced content of cholesterol and of free fatty acids is obtained. The reduction ratio of the cholesterol is in this case greater than 85%.

We claim:

1. A process for reducing the content of cholesterol and of free fatty acids in a fat of animal origin comprising forming a fine emulsion of the oil-in-water type by contacting under vigorous stirring the fat with a cyclodextrin in the presence of water in a ratio by weight water/fat between 0.4/1 and 1.9/1 so that complexes between the cyclodextrin and the cholesterol and the free fatty acids are formed, and then separating said complexes from said fat whereby, in a single operation, the cholesterol content of the fat is reduced by at least about 37%.

2. The process according to claim 1, wherein the water/fat ratio is between 0.7/1 and 1.5/1.

3. The process according to claim 1, wherein the water/fat ratio is about 1/1.

4. The process according to claim 1, wherein the stirring is performed by means of a stirrer rotating at a speed higher than 800 r.p.m.

5. The process according to claim 4, wherein the stirring is performed by means of a stirrer rotating at a speed higher than 2000 r.p.m.

6. The process according to claim 1, wherein the cyclodextrin is added in an amount between 1 and 10% by weight with respect to the amount of fat.

7. The process according to claim 6, wherein the cyclodextrin is added in an amount between 3 and 8% by weight with respect to the amount of fat.

8. The process according to claim 1, wherein the temperature of the fat-water-cyclodextrin medium is regulated, for a given concentration of cyclodextrin, to a value of about the solubility temperature of cyclodextrin in water for this concentration.

9. The process according to claim 1, wherein the contact between the fat, the cyclodextrin and the water is maintained for about 1 to 20 minutes.

10. The process according to claim 1, wherein the separation step of the complexes is carried out at a temperature below a temperature employed during the formation of the complexes.

11. The process according to claim 1, wherein the separation step is performed by cold churning of the emulsion.

12. The process according to claim 1, wherein the cyclodextrin used is $\beta$-cyclodextrin.

13. The process according to claim 1, wherein fat globules in the emulsion have a size less than about 40 micrometers.

14. The process according to claim 1, wherein the animal fat is milk fat.

15. The process according to claim 14, wherein the animal fat is butter.

16. The process according to claim 14, wherein the animal fat is anhydrous dairy fat.

17. The process according to claim 14, wherein the animal fat is dairy cream.

18. The process according to claim 1, wherein the animal fat is suet.

19. The process according to claim 1, wherein the animal fat is lard.

20. A process for reducing the content of cholesterol in a fat of animal origin, comprising forming a fine emulsion of the oil-in-water type by contacting under vigorous stirring the fat with a cyclodextrin in the presence of water in a ratio by weight water/fat between 0.4/1 and 1.9/1 so that complexes between the cyclodextrin and the cholesterol are formed, and then separating said complexes from said fat whereby, in a single operation, the cholesterol content of the fat is reduced by at least about 37%.

* * * * *